US007534019B2

(12) United States Patent
Delourme et al.

(10) Patent No.: US 7,534,019 B2
(45) Date of Patent: May 19, 2009

(54) ELLIPTICAL OPTICAL MODULE WITH LIGHT SHIELD FOR A MOTOR VEHICLE

(75) Inventors: Jean-François Delourme, Bobigny Cedex (FR); Nicolas Simmet, Bobigny Cedex (FR)

(73) Assignee: Valeo Vision, Bobigny Cedex (FR)

( * ) Notice: Subject to any disclaimer, the term of this patent is extended or adjusted under 35 U.S.C. 154(b) by 0 days.

(21) Appl. No.: 11/186,715

(22) Filed: Jul. 21, 2005

(65) Prior Publication Data

US 2006/0114677 A1 Jun. 1, 2006

(30) Foreign Application Priority Data

Jul. 30, 2004 (FR) .................................. 04 08490

(51) Int. Cl.
*B60Q 1/00* (2006.01)
*B60Q 3/00* (2006.01)
*F21V 7/00* (2006.01)
*F21V 17/02* (2006.01)

(52) U.S. Cl. ....................... 362/539; 362/303; 362/305; 362/507; 362/512

(58) Field of Classification Search ................. 362/539, 362/303, 305, 507, 512, 538
See application file for complete search history.

(56) References Cited

U.S. PATENT DOCUMENTS 2,061,000 A * 11/1936 Michel et al. ............... 362/286
5,718,505 A * 2/1998 Daumueller et al. ........ 362/279
5,899,559 A * 5/1999 Lachmayer et al. ......... 362/513
6,443,606 B1 * 9/2002 Mochizuki .................. 362/513
6,467,940 B2 * 10/2002 Eschler et al. .............. 362/510
6,491,419 B1 * 12/2002 Ohshio ....................... 362/539
6,550,944 B2 * 4/2003 Kusagaya ................... 362/466
6,857,768 B2 * 2/2005 Watanabe et al. ........... 362/512
6,874,923 B2 * 4/2005 Albou et al. ................ 362/512
6,997,590 B2 * 2/2006 Garcia et al. ................ 362/539
7,008,093 B2 * 3/2006 Fukawa et al. .............. 362/539
7,140,759 B1 * 11/2006 Tsai et al. ................... 362/539
7,350,948 B2 * 4/2008 Nino et al. .................. 362/539
2003/0081424 A1 * 5/2003 Albou et al. ................ 362/513
2007/0147061 A1 * 6/2007 Lee et al. .................... 362/513

FOREIGN PATENT DOCUMENTS

DE 100 22 235 11/2001
EP 1 139 017 10/2001
EP 1 160 507 12/2001

OTHER PUBLICATIONS

French Search Report dated Mar. 14, 2005.

* cited by examiner

*Primary Examiner*—Jong-Suk (James) Lee
*Assistant Examiner*—David J Makiya
(74) *Attorney, Agent, or Firm*—Locke Lord Bissel & Liddell

(57) ABSTRACT

The invention concerns an elliptical optical module intended for a motor vehicle. The elliptical optical module comprises a reflector intended to receive a light source. The elliptical optical module also comprises a shield comprising at least one support flap and an optically active flap. The optically active flap obstructs at least part of the light rays emitted by the light source. The elliptical optical module also comprises a convex lens intended to receive at least part of the light rays. The elliptical optical module comprises elastic fixing means for holding the shield on a support piece.

11 Claims, 3 Drawing Sheets

Fig. 3A
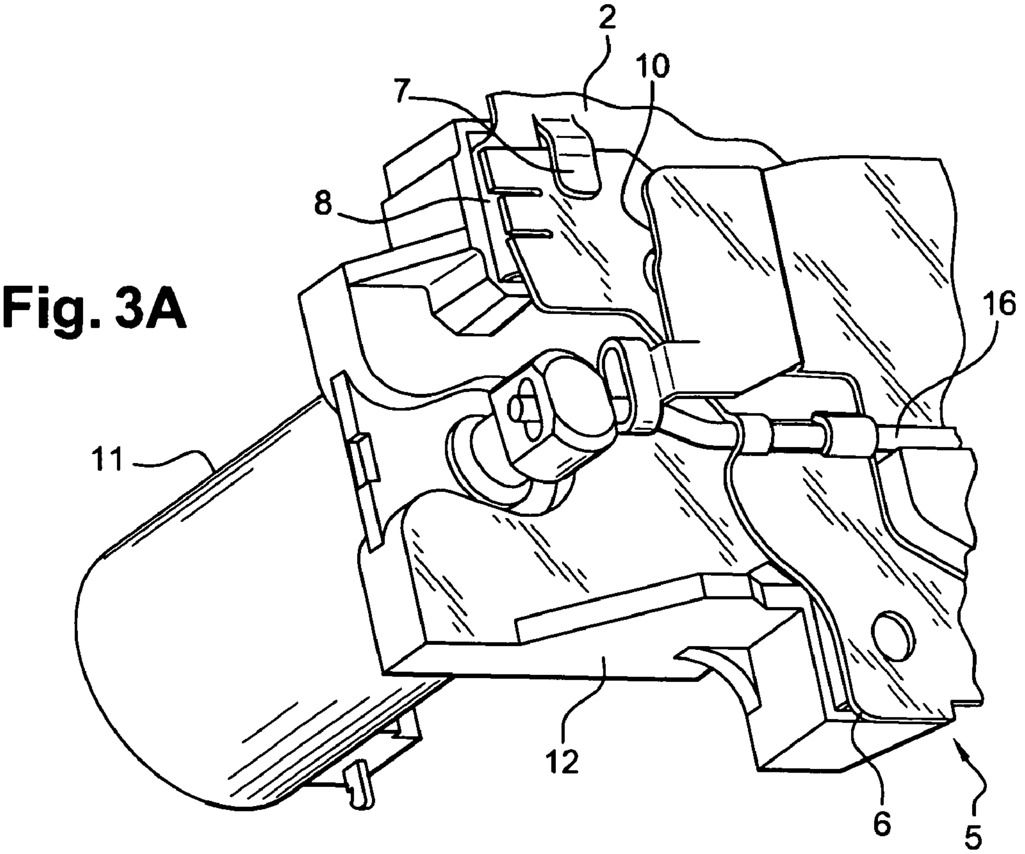
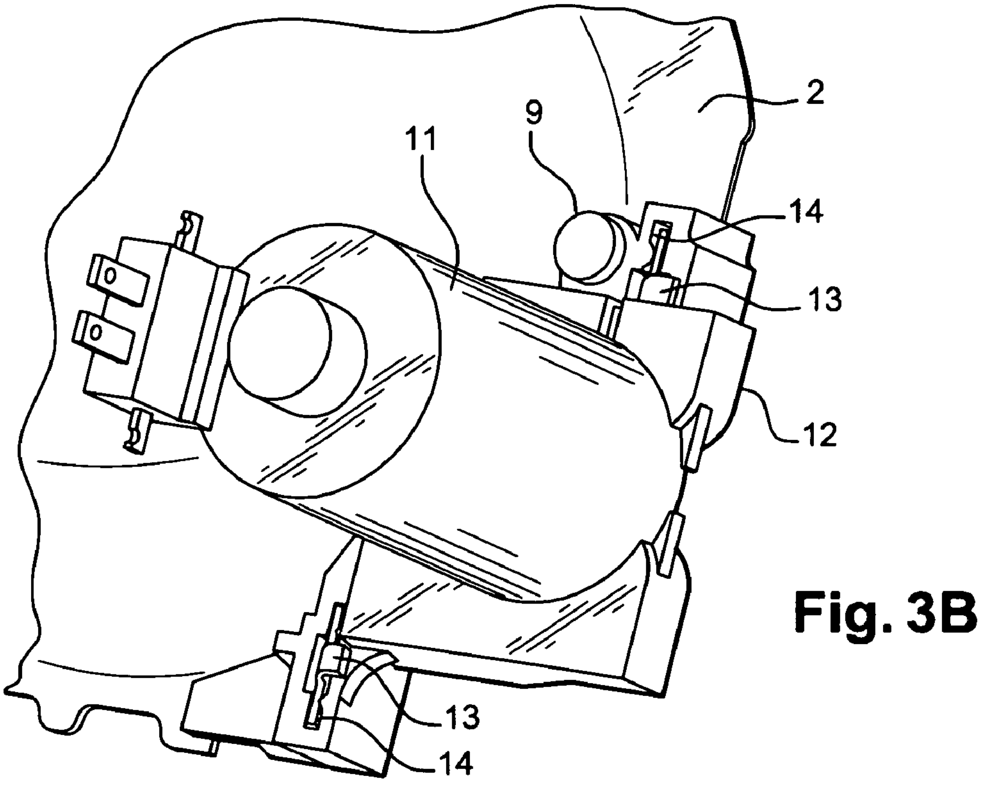
Fig. 3B

ELLIPTICAL OPTICAL MODULE WITH LIGHT SHIELD FOR A MOTOR VEHICLE

FIELD OF THE INVENTION

The present invention relates to the field of elliptical optical modules with light shield, intended for a motor vehicle.

BACKGROUND OF THE INVENTION

The field of the invention is, in general terms, that of motor vehicle headlamps. In this field, the headlamps can fulfil various signalling and/or lighting functions, for example side lights, dipped lights, main beam or daytime lights.

Two types of lighting and/or signalling module are essentially known, each having a distinct structure: traditional optical modules and elliptical optical modules.

Traditional optical modules are composed essentially of a mirror reflector associated with a light source.

An elliptical optical module comprises essentially a light source, a reflector and a convex lens. The light source, the reflector and the lens are disposed so as to produce a light beam of given photometry. For example, for a main beam, the light rays emitted by the light source are approximately horizontal when the elliptical optical module is installed in a motor vehicle.

An intermediate part, referred to as the “intermediary”, and not having any particular optical properties, attaches the convex lens to the reflector.

The elliptical optical module can comprise a shield or cover situated between the reflector and the intermediate part. The shield retains part of the light rays. An elliptical optical module of this type can for example fulfil a dipped light function.

An elliptical optical module without shield on the contrary produces a light beam of relatively high intensity. An elliptical optical module of this type can for example fulfil a main beam function.

The shield may be a fixed shield, that is to say the elliptical module fulfils only one function, or a removable shield, which enables the elliptical optical module to fulfil several functions.

The shield in general terms comprises a supporting flap and an optically active flap.

The optically active flap obstructs at least part of the light rays. The optically active flap comprises an active edge, typically a top edge, defining the cut-off of the light beam. The active edge can be substantially horizontal, in particular in order to fulfil a fog light function, or have another shape according to the current regulations in Europe, the United States and Japan. The optically active flap can have a substantially flat shape, or a slightly curved shape.

In the case of a fixed shield, the support flap and the optically active flap are merged, that is to say the fixed shield comprises only fixed components, in particular a single flap, which serves to obstruct at least part of the light rays emitted by the light source.

In the case of a moving shield, the optically active flap is able to move relative to the support flap. The support flap serves as a support for the optically active flap, which effectively serves to obstruct at least part of the light rays.

The support flap of a moving shield is conventionally substantially flat and conventionally has a U shape. The support flap is fixed to a support piece, generally the reflector itself, so that the plane of the support flap is substantially perpendicular to an optical axis of the elliptical optical module.

The optically active flap can for example pivot about an axis of rotation under the direct or indirect effect of an actuator. The optically active flap can be fixed to a transmission shaft in contact with the actuator. The actuator is controlled by the driver of the motor vehicle. For example, when the driver decides to change from the dipped beam function to the main beam function, the actuator is controlled so that the optically active flap is lowered. The moving shield then does not form an obstacle to the light rays and the beam thus produced has a relatively high intensity.

The actuator is fixed directly to the reflector, or directly to the support flap of the moving shield.

However, the active edge of the optically active flap of the shield, whether it be moving or fixed, may cause optical diffraction. Such diffraction depends directly on the wavelength of the light rays and may give rise to chromatic aberrations.

It is known how to use means of adjusting the chromatics in order to remedy the chromatic aberrations. At least part of the shield may be pushed towards the lens, by virtue of a screw for adjusting the chromatics. The adjustment of the chromatics typically takes place during a setting step prior to the assembly of the elliptical optical module in the motor vehicle.

However, when an elliptical optical module to be shielded is installed in a motor vehicle and the latter is running, the shield may bounce because of external vibrations on the support piece, typically the reflector or the intermediate piece, or on the chromatics adjustment screw where applicable. Such bounces give rise to immediate variations in the light beam produced either in the case of a fixed shield or in the case of a moving shield with an optically active flap raised or in the process of pivoting, and may eventually impair the shield.

The present invention aims to improve the reliability of an elliptical optical module comprising a shield.

SUMMARY OF THE INVENTION

The elliptical optical module according to the invention, intended for a motor vehicle, comprises a reflector intended to receive a light source, a shield comprising at least one support flap and an optically active flap for obstructing at least part of the light rays emitted by the light source, a convex lens intended to receive at least part of the light rays, wherein the elliptical optical module comprises elastic fixing means for holding or positioning the shield on a support piece and means of adjusting the chromatics for adjusting the position of at least part of the shield, the elastic fixing means cooperating with the means of adjusting the chromatics in order in particular to elastically absorb the shield position adjustments during chromatics adjustments.

The elastic fixing means prevent bounces of the shield, in particular when the elliptical optical module is subjected to external vibrations. Thus, when the elliptical optical module according to the present invention is installed in a motor vehicle, and the latter is running, the light beam produced by the light source remains stable. The shield is also less impaired because of the bounces than in the elliptical optical modules according to the prior art.

The light source typically comprises a lamp of the halogen type, a lamp of the xenon type or at least one light emitting diode.

The support piece is preferably substantially parallel to the shield support flap. The elastic fixing means advantageously hold the support flap against the support piece.

The elastic fixing means thus at least partially absorbs the energy produced by the bounces of the support flap in a direction substantially perpendicular to a plane of the support flap.

The optically active flap may or may not also be held against the support piece by the fixing means.

The present invention is not limited by the part of the shield that is held on the support piece by the elastic fixing means.

The present invention is not limited by the relative positions of the support piece and support flap.

The elastic fixing means can also prevent or minimise bounces in a direction substantially parallel to the plane of the support piece, for example, vertical or lateral bounces when the elliptical optical module is installed in a motor vehicle.

The elastic fixing means cooperate with the means of adjusting the chromatics, which makes it possible in particular to elastically absorb the shield position adjustments during chromatics adjustments. The elastic fixing means can thus fulfil two roles at the same time: preventing the shield flap oscillating, when it uses a moving flap, and preventing the latter passing from its inactive/retracted position to its active position, also preventing oscillations of the shield, whether it be of the fixed or moving type, when the headlamp is subjected to external vibrations (poor state of the road, etc), but also absorption of small movements of the shield when its position is adjusted for chromatics problems, by the capacity of these elastic means, for example, to deform.

The chromatics adjustment means advantageously comprise a self-tapping screw.

Self-tapping screws have in effect the advantage of having, once screwed, a relatively high resistance to rotation thereby avoiding the fitting of a thread locking piece. The method of manufacturing the elliptical optical module according to the present invention is thus slightly simplified.

The self-tapping screw can be supported by an intermediate piece for also attaching the convex lens to the reflector, or by any other piece.

The present invention is however not limited by the presence or by the nature of the chromatics adjustment means. For example, a traditional screw may be used as a chromatics adjustment means.

The self-tapping screw advantageously makes it possible to adjust the position of the shield support flap.

The self-tapping screw makes it possible to push the support flap of the shield in the direction of an optical axis of the elliptical optical module.

Alternatively, the self-tapping screw makes it possible to move the shield in another direction.

Alternatively, the self-tapping screw makes it possible to adjust the position of another part of the shield.

The self-tapping screw is advantageously disposed substantially perpendicular to the shield support flap. The elastic fixing means advantageously make it possible to return the support flap against the self-tapping screw.

The support flap is thus held on the support piece between the self-tapping screw and the elastic fixing means.

The present invention is however not limited by the relative positions of the elastic fixing means and the chromatics adjustment means.

The reflector advantageously comprises the support piece. The elastic fixing means comprise at least one tongue integrated in the reflector.

The support piece is included in the reflector and the tongue is integrated in the reflector. The support piece and the elastic fixing means can thus be implemented without any additional part, thereby making it possible not to make the method of manufacturing the elliptical optical module more complex.

The reflector can comprise a cavity in which the light source can be introduced and, at the other end, a substantially flat contour substantially parallel to the shield. The contour serves as a support piece against which the shield is held. Two tongues integrated in the reflector and situated on each side of the contour make it possible to hold the shield and thus attenuate the bounces of the shield towards the convex lens.

Alternatively, only one tongue is used or more than two tongues.

Alternatively, the support piece is not included in the reflector. The support piece may for example be included in the intermediate piece. In this case, the elastic fixing means can for example comprise two tongues integrated in the intermediate piece. The tongues prevent bounces of the shield towards the cavity of the reflector.

The support piece can also be distinct from the reflector and from the intermediate piece.

The elastic fixing means can also not be integrated in the reflector nor in the intermediate piece. In general terms, the present invention is not limited by the nature of the elastic fixing means.

Advantageously, the optically active flap is able to move relative to the support flap. The elliptical optical module advantageously comprises an actuator under the effect of which the optically active flap pivots.

The shield is thus a moving shield. The support flap serves conventionally as a support for the optically active flap, which effectively makes it possible to obstruct at least part of the light rays.

The support flap may for example have a substantially flat shape roughly in a U.

Part of the support flap may be rigidly fixed to the support piece, for example a bottom part of the support flap is fixed rigidly between the reflector and the intermediate piece.

The self-tapping screw makes it possible to adjust the position of a high part of the shield support flap. The high part of the shield support flap is however held by the elastic fixing means against the support piece.

Such an elliptical optical module with a moving shield can thus fulfil at least two functions, for example main beams when the optically active flap is lowered, and dipped beams when the optically active flap obstructs part of the light rays emitted by the light source.

This example is of course not limiting.

Alternatively, the support flap and the optically active flap are merged.

An elliptical optical module comprising a fixed shield of this type is in general associated with a single function, for example dipped beams. The elliptical optical module with fixed shield according to the present invention comprises elastic fixing means for holding the fixed shield on a support piece. The elliptical optical module can also comprise means of adjusting the chromatics making it possible to adjust the position of the fixed shield.

The present invention is therefore not limited by the form or nature of the shield.

The actuator is advantageously fixed to the reflector by means of an actuator support.

The intermediate piece and the reflector can both be produced from metallic sheet, or from another material, of the aluminium type.

The metallic sheet has the advantage of offering relatively high mechanical strength for relatively low weight: a reflector made from metallic sheet will therefore, for a given mechanical strength, be thinner and lighter than an aluminium reflector.

On the other hand, aluminium is a material that is generally easier to mould than metallic sheet.

The elliptical optical module according to the present invention can comprise an actuator support for indirectly fixing the actuator to the reflector. The elliptical optical module according to the prior art comprise an actuator fixed directly to the reflector. The actuator support makes it possible to fix the actuator without having any tricky moulding to perform on the reflector, which may be particularly advantageous in the case of a reflector made from metallic sheet.

The actuator support can be produced from a plastics material or from another material.

The actuator support can be designed so as to be able to be fixed either on the right side or on the left side of the reflector.

Alternatively, the actuator support has a specific form so that a given actuator support can be fixed only on one of the sides of the reflector.

Alternatively, the actuator may be fixed directly to the reflector, whatever the material from which the latter is produced.

In addition, the present invention is not limited by the way in which the movement of the optically active flap is implemented - the optically active flap may for example slide vertically, in translation movement, nor by the means allowing the movement of the optically active flap.

The reflector advantageously comprises at least one foldable fixing lug. The actuator support advantageously comprises at least one fixing slot intended to receive the foldable fixing lug, so as to allow the fixing of the actuator support to the reflector.

The actuator support is thus fixed to the reflector in a relatively simple manner, without involving any additional fixing elements. The method of fixing the actuator support is thus relatively easy to implement: it suffices to slide the foldable fixing lug in the fixing slot of the actuator support and to fold it over the actuator support.

When the reflector is produced from metallic sheet, a foldable fixing lug of this type is relatively easy to produce.

The reflector preferably comprises a plurality of foldable fixing lugs, for example two. The actuator support preferably comprises a plurality of fixing slots so that each foldable fixing lug of the reflector can be inserted and folded in an associated fixing slot in the actuator support.

The present invention is however not limited by the way in which the fixing of the actuator support on the reflector is implemented. The actuator support may for example be screwed, snapped on or moulded onto the reflector. The actuator is advantageously moulded onto the actuator support.

The fixing of the actuator on the reflector thus involves fewer components to be positioned with respect to one another.

The present invention is however not limited by the way in which the fixing of the actuator on the actuator support is implemented. The actuator may for example be screwed or snapped onto the actuator support.

Another object of the present invention is a headlamp intended for a motor vehicle and comprising an optical module, in particular elliptical, according to the present invention.

Another object of the present invention is an elliptical optical module intended for a motor vehicle. The elliptical optical module comprises a reflector intended to receive a light source. The elliptical optical module also comprises a shield. The shield comprises at least one support flap and an optically active flap. The optically active flap obstructs at least part of the light rays emitted by the light source. The elliptical optical module also comprises a convex lens intended to receive at least part of the light rays. The elliptical optical module also comprises means of adjusting the chromatics, making it possible to adjust the position of the shield support flap.

The means of adjusting the chromatics can in particular be associated with elastic fixing means for holding the support flap against a support piece. In the case of a moving shield the support flap is thus held against the support piece, whilst remaining adjustable whilst the optically active flap is able to move relative to the support flap.

Alternatively, the elliptical optical module comprises the means of adjusting the chromatics making it possible to adjust the position of the support flap, but the support flap is not held elastically against the support piece.

The invention is described below in more detail with the help of figures, depicting only a preferred embodiment of the invention.

BRIEF DESCRIPTION OF THE DRAWINGS

FIGS. 3A and 3B are views in perspective, front and rear, and in detail, of an example of an elliptical optical module according to a second embodiment of the present invention.

DESCRIPTION OF THE PREFERRED EMBODIMENTS

It should be noted that identical elements or parts have been designated by the same reference numbers in the various figures.

Figure 1:
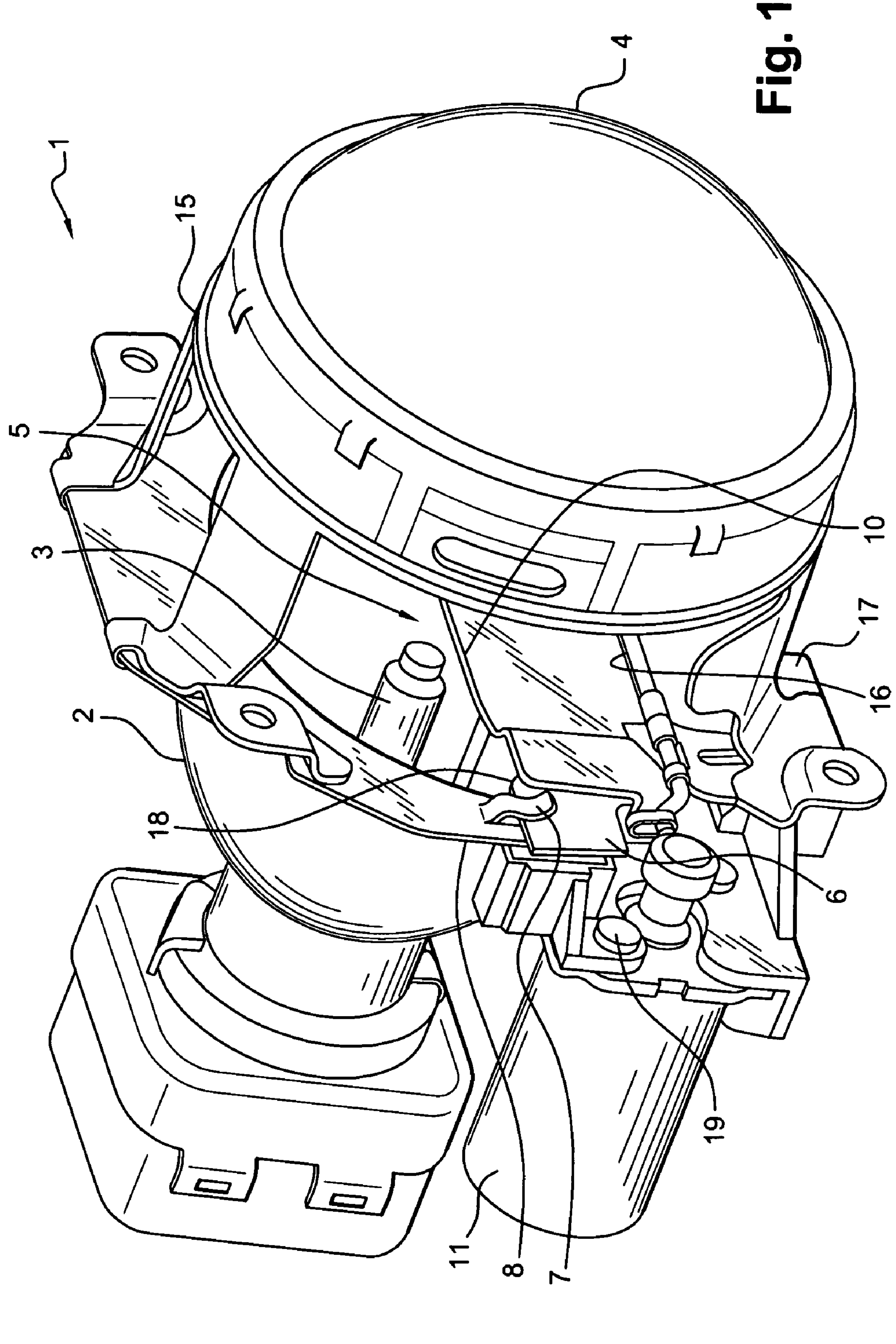
FIG. 1 is a perspective view of an example of an elliptical optical module according to a first embodiment of the present invention.
Figure 2:
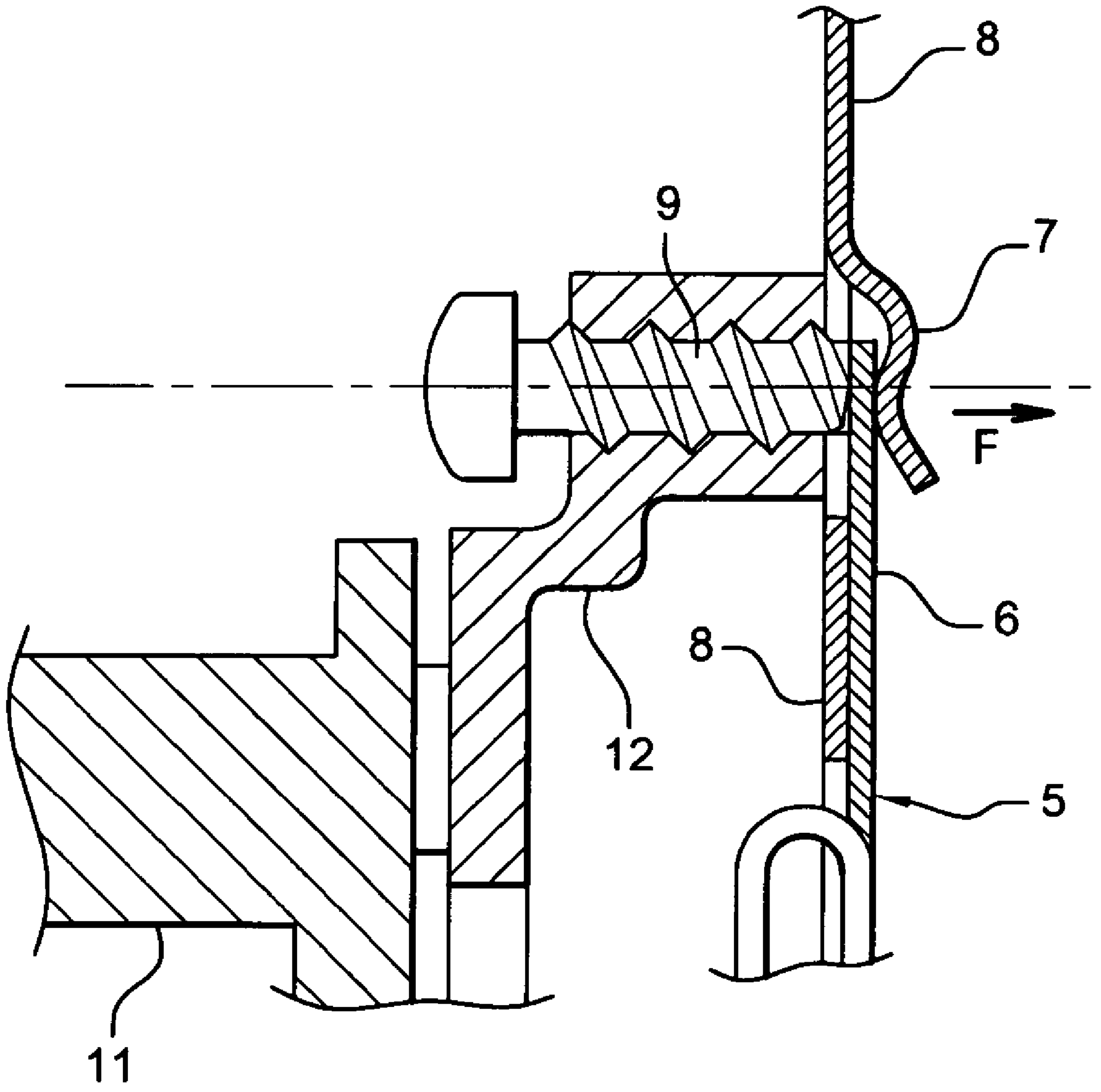
FIG. 2 is a schematic view, in section and in detail, of an example of an elliptical optical module according to the first embodiment of the present invention.

Referring to FIGS. 1 and 2, an optical module 1 according to the first embodiment is intended to be used in a headlamp, not shown, for a motor vehicle, not shown. The elliptical optical module 1 comprises a reflector 2, a light source 3 and a convex lens 4.

An intermediate piece 15 attaches the convex lens 4 to the reflector 2.

The elliptical optical module 1 also comprises a shield 5, comprising a support flap 6 and an optically active flap 10. In the first embodiment, the shield 5 is a moving shield, that is to say the optically active flap 10 is able to move relative to the support flap 6.

The optically active flap 10 can pivot under the effect of an actuator 11: the optically active flap 10 is fixed to a transmission shaft 16 in contact with the actuator 11.

A bottom part 17 of the support flap 6 is rigidly fixed between the reflector 2 and the intermediate piece 15. However, a chromatics adjustments screw, for example a self-tapping screw 9, makes it possible to adjust the position of a top part 18 of the support flap 6, thereby making it possible to remedy chromatic aberrations due to optical diffraction on an active edge of the shield.

Once the chromatics is adjusted, the self-tapping screw 9 is moved only a relatively small amount under the effect of external vibrations, without involving any supplementary piece, such as a thread locking piece.

Elastic fixing means 7 hold the top part 18 of the support flap 6 of the shield 5 against a support piece 8. The elastic fixing means 7 comprise a tongue integrated in the reflector 2, on each side of the elliptical optical module 1.

The reflector 2 also comprises the support piece 8.

The support piece 8 against which the support flap 6 of the shield 5 is held is substantially parallel to the support flap 6. The self-tapping screw 9 for its part is substantially perpendicular to the support flap 6 of the shield 5. The self-tapping screw 9 makes it possible to push the support flap 6 in a forward direction, indicated by the arrow F.

The elastic fixing means 7 prevent any bouncing of the support flap 6 of the shield 5 when the optical module 1 is fitted in the motor vehicle and the latter is running.

The actuator 11 is in a first embodiment fixed to an actuator support 12 by at least one fixing screw 19. The actuator support 12 is itself fixed to the reflector 2. The actuator support 12 comprises, in this first embodiment, a screwing barrel for accepting the self-tapping screw 9.

In an embodiment that is not shown, the actuator is fixed directly to the reflector.

The actuator support 12 makes it possible to avoid moulding actuator fixings in the reflector 2, which may be particularly advantageous in the case of a reflector 2 made from metallic sheet.

FIGS. 3A and 3B illustrate an example of an elliptical optical module according to a second embodiment of the present invention.

The elliptical optical module comprises a reflector 2 and a shield 5. The shield 5 comprises here also a support flap 6 and an optically active flap 10 able to pivot about a rotation axis under the effect of an actuator 11.

In the second embodiment of the present invention, the actuator is fixed to an actuator support 12. The actuator support 12 is produced from a plastics material having relatively high thermal resistance, so as to be able to resist the heat created by a light source, not shown in FIGS. 3A and 3B.

The actuator 11 is, in the second embodiment, moulded onto the actuator support 12.

The elliptical optical module according to the second embodiment of the present invention is easier to manufacture than the elliptical optical module according to the first embodiment of the present invention because of the absence of a fixing screw for fixing the actuator 11 to the actuator support 12. Moulding the actuator 11 onto the actuator support 11 improves the precision and repeatability of the positioning of the actuator 11 with respect to a transmission shaft 16. The reliability of the elliptical optical module is thus also improved.

In the second embodiment of the present invention, the reflector 2 is made from a metallic sheet. The reflector 2 comprises foldable fixing lugs 13. The actuator support 12 comprises fixing slots 14 in which the foldable fixing lugs 13 of the reflector 2 can be inserted and folded, thereby allowing a fixing of the actuator support 12 to the reflector 2 that is relatively simple to implement.

In addition, the elliptical optical module according to the second embodiment of the present invention comprises two tongues allowing elastic fixing of the support flap 6 to the support piece 8. The reflector 2 comprises the support piece 8 and the tongues 7 are integrated in the reflector, thus avoiding any additional parts.

The elliptical optical module according to the second embodiment of the present invention also comprises a self-tapping screw 9 disposed substantially perpendicular to the support flap 6.

According to an alternative embodiment, not shown, the position of the support flap is adjustable by a self-tapping screw, but the support flap is not held against the support piece by elastic fixing means.

The embodiment depicted in the figures are alternative or can be associated/combined.

What is claimed is:

1. An elliptical optical module, intended for a motor vehicle, comprising:

a reflector intended to receive a light source, said reflector including a support piece, an intermediate piece attached to said support piece of said reflector, a shield comprising an optically active flap for obstructing at least part of the light rays when emitted by the light source and a support flap, said optically active flap including an active edge, said support flap comprising a top part and an opposing bottom part, said opposing bottom part of said support flap of said shield being rigidly fixed between said support piece of said reflector and said intermediate piece, a convex lens being disposed to receive at least a part of the light rays, said reflector includes at least one elastic fixing means for elastically holding or positioning said top part of said support flap of said shield against said support piece of said reflector, and a chromatics adjustment means for adjusting a position of said top part of said support flap of said shield relative to said reflector for correcting chromatic aberrations resulting from optical diffraction on said active edge of the shield, said at least one elastic fixing means cooperating with said chromatics adjustment means to elastically absorb position adjustments of said shield.

2. The elliptical optical module according to claim 1, wherein said optically active flap is fixed or moveable with respect to said support flap.

3. The elliptical module according to claim 1, wherein said chromatics adjustment means includes a self-tapping screw.

4. The elliptical module according to claim 3, wherein said self-tapping screw makes it possible to adjust the position of said top part of said support flap of said shield.

5. The elliptical module according to claim 4, wherein said self-tapping screw is disposed substantially perpendicular to said support flap of said shield.

6. The elliptical module according to claim 1, wherein said at least one elastic fixing means comprises at least one tongue integrated as a portion of the reflector.

7. The elliptical module according to claim 1, wherein said optically active flap is movable relative to said support flap and the elliptical optical module includes an actuator for moving said optically active flap.

8. The elliptical module according to claim 7, wherein said actuator is fixed to said reflector by means of an actuator support.

9. The elliptical module according to claim 7, wherein said reflector further includes at least one foldable fixing lug, and said elliptical module further includes an actuator support having at least one fixing slot, said at least one foldable fixing lug fixing said actuator support on said reflector.

10. The elliptical module according to claim 7, wherein said actuator is molded onto said actuator support.

11. The elliptical optical module according to claim 1, wherein the elliptical optical module is part of a headlamp intended for a motor vehicle.

* * * * *